(Model.)
2 Sheets—Sheet 1.
B. W. SMITH.
Stalk Cutter.
No. 231,111.
Patented Aug. 10, 1880.
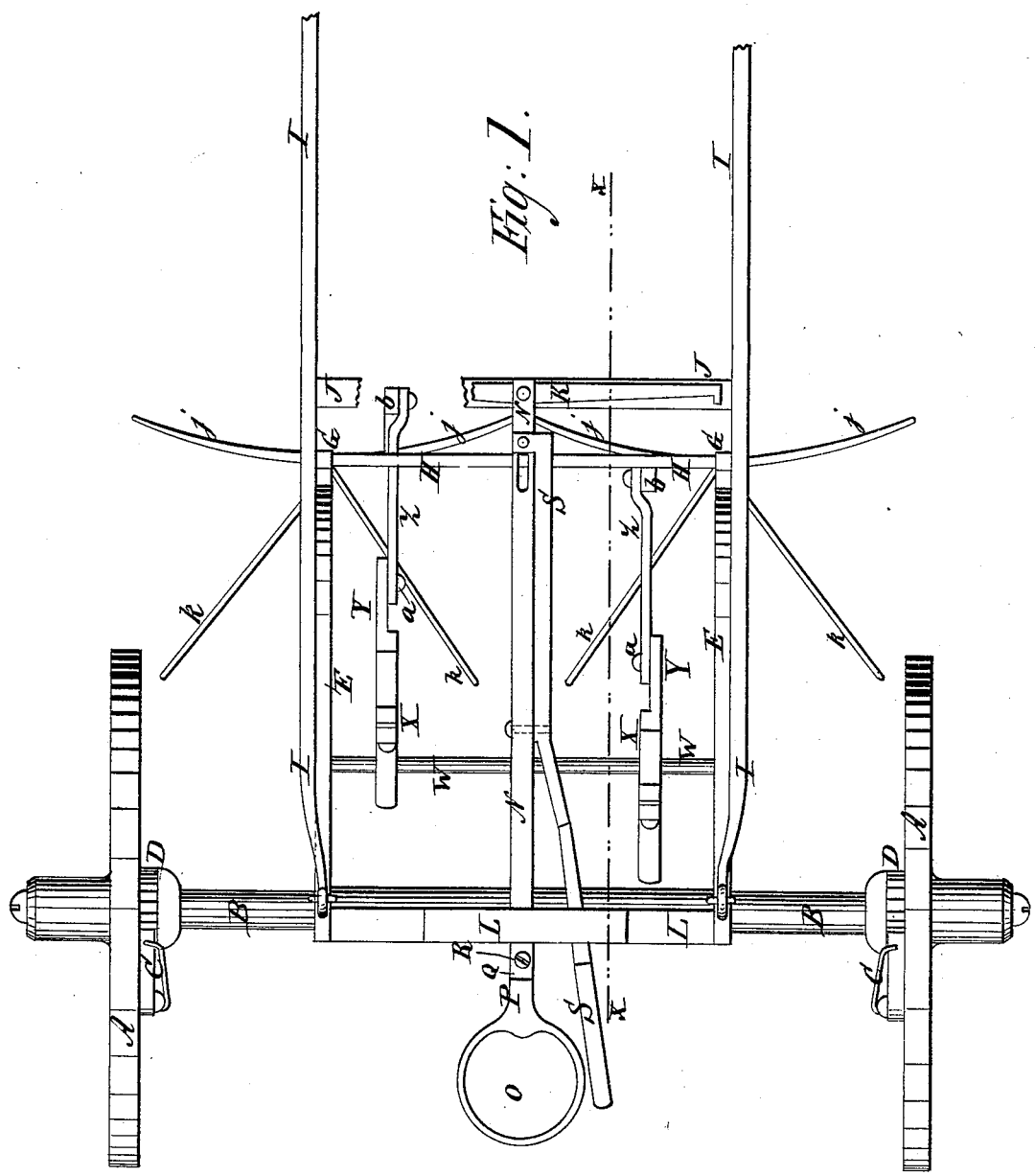
WITNESSES:
A. Schehl.
C. Sedgwick
INVENTOR:
B. W. Smith
BY Munn & Co
ATTORNEYS.

(Model.) 2 Sheets—Sheet 2.
B. W. SMITH.
Stalk Cutter.
No. 231,111. Patented Aug. 10, 1880.
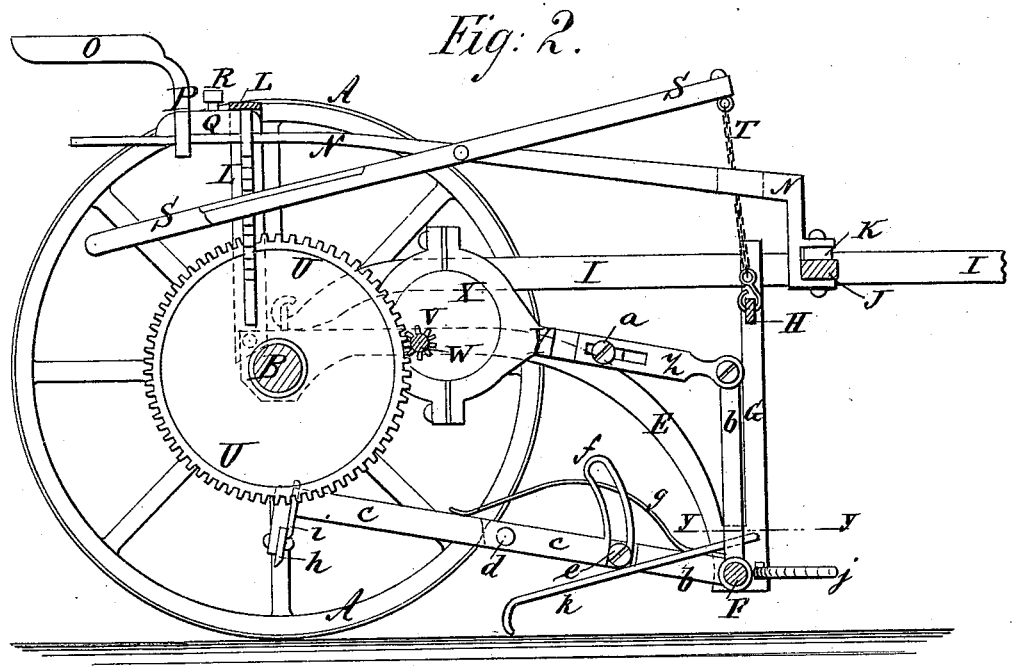
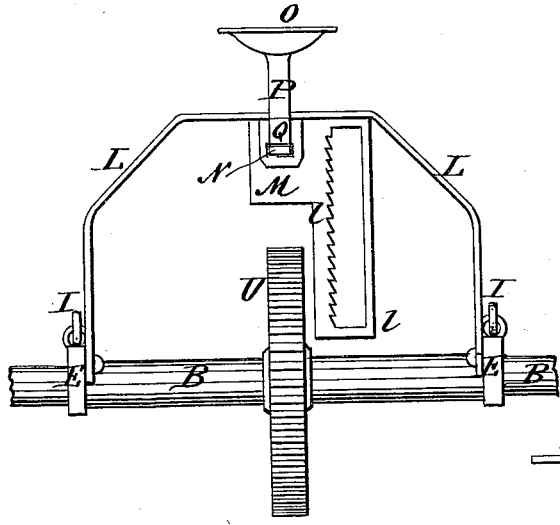
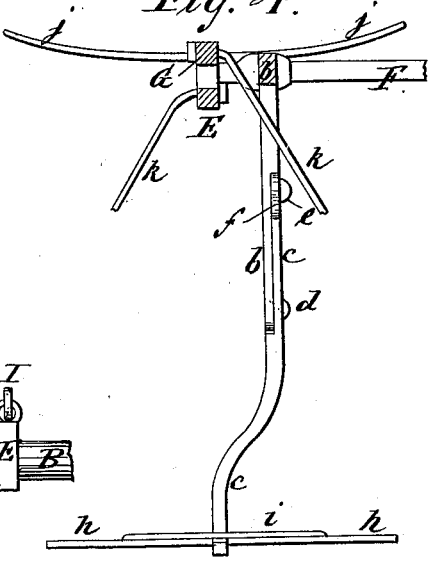
WITNESSES:
A. Schehl.
C. Sedgwick
INVENTOR:
B. W. Smith
BY Munn & Co
ATTORNEYS.

UNITED STATES PATENT OFFICE.

BRAINERD W. SMITH, OF NINEVEH, INDIANA.

STALK-CUTTER.

SPECIFICATION forming part of Letters Patent No. 231,111, dated August 10, 1880.

Application filed June 12, 1880. (Model.)

*To all whom it may concern:*

Be it known that I, BRAINERD W. SMITH, of Nineveh, in the county of Johnson and State of Indiana, have invented a new and useful Improvement in Stalk-Cutters, of which the following is a specification.

Figure 1, Sheet 1, is a plan view of the improvement. Fig. 2, Sheet 2, is a sectional side elevation taken through the line $x\ x$, Fig. 1. Fig. 3, Sheet 2, is a rear elevation, showing the axle, gear-wheel, seat-frame, seat, and catch-plate. Fig. 4, Sheet 2, is a sectional plan view taken through the line $y\ y$, Fig. 2.

The object of this invention is to furnish machines for cutting cornstalks and other stalks in the field, so constructed as to lay the stalks in proper position and cut them with certainty, and which shall be simple in construction, of a light draft, and convenient in use.

The invention consists in constructing a stalk-cutter of the wheels and axle, the curved bars, the uprights, the cross-bars, the central bar, and the arched bar, forming a framework to receive the operating parts, the gear-wheels, the shaft, the eccentrics, the extension-bars, the angle-levers, having springs, the bars, having slotted arms, and the cutters for operating the cutters by the advance of the machine, and mechanism for adjusting the frame-work, and the driver's seat, as will be hereinafter fully described.

Similar letters of reference indicate corresponding parts.

A are the wheels, which are placed upon the journals of the axle B, and are made to carry the said axle with them in their revolution when the machine is drawn forward by the spring-pawls C, pivoted to the said wheels A, and engaging with ratchet-wheels D, attached to the said axle B.

The axle B revolves in bearings in the rear ends of two bars, E, which are placed at a distance apart about equal to the distance apart of the rows of stalks. The bars E project forward, are curved downward, and their forward ends are connected by a cross-bar, F.

To the forward ends of the curved bars E are rigidly attached, or upon them are formed, upwardly-projecting arms G, to serve as guards to cause the forward ends of the bars E to move up and down in the same vertical plane. The upper parts of the arms G are connected and held in position by a cross-bar, H.

I are the thills, the rear ends of which have hooks formed upon them to hook into eyebolts attached to the rear ends of the bars E, or are otherwise connected with the said bars E, or with the axle B.

The thills I are connected a little in front of the upright arms G by a cross-bar, J, to the center of which is pivoted the single-tree K, to which the draft is applied.

To the rear ends of the bars E are pivoted the ends of an arched bar, L, to the lower side of the center of which is attached a plate or keeper, M, having a hole formed through it to receive the bar N. The forward end of the bar N is bent downward at right angles, has legs formed upon it, and is secured to the cross-bar J of the thills I by the bolt that pivots the single-tree K to the said cross-bar J.

O is the driver's seat, which is formed upon or attached to the upper end of the standard P. The lower end of the seat-standard P has a hole formed through it to receive the rearwardly-projecting end of the bar N and the rear end of the block Q, which rests upon the said bar N, and has flanges, shoulders, or notches upon its ends to keep it in connection with the arched bar L and the seat-standard P.

R is a set-screw, which passes through a screw-hole in the block Q and presses against the bar N, so as to fasten the said bar N, the arched bar L, and the seat-standard P firmly together.

With this construction the seat O can be adjusted to cause the driver's weight to balance the machine by loosening the set-screw R and swinging the middle part of the arched bar L forward or back.

To the middle part of the bar N is pivoted the middle part of the lever S, the forward end of which is bent to one side over the forward part of the bar N, and has the end of a chain or cord, T, attached to it.

The chain or cord T passes down through a slot in the bar N, and its lower end is attached to the center of the cross-bar H, that connects the arms G, so that the forward ends of the bars E and their attachments can be raised and lowered by operating the lever S. The rear part of the lever S passes through a vertical slot in the plate $l$ and catches upon teeth formed in the said plate $l$ at one side of the slot, so that the lever S will be held securely in any position into which it may be adjusted.

To the center of the axle B is attached a large gear-wheel, U, the teeth of which mesh into the teeth of a small gear-wheel, V, attached to or formed upon the center of the shaft W. The ends of the shaft W revolve in bearings in the bars E. To the end parts of the shaft W are attached eccentrics X, with their longest radii projecting in opposite directions. With the eccentrics X are connected, by eccentric-straps in the usual manner, the rear ends of the bars Y, the forward ends of which overlap the rear ends of the bars Z, and are secured to the said bars Z by clamping-screws $a$. The rear parts of the bars Z are slotted to receive the fastening-screws $a$, so that the bars Y Z can be extended or contracted by loosening the said screws $a$. The forward ends of the bars Z are pivoted to the ends of the upper arms of the right-angled levers $b$, which levers are pivoted at their angles to the bar or rod F, that connects the forward ends of the bars E. The rear ends of the lower arms of the levers $b$ overlap the forward ends of the bars $c$, and are connected with the said bars $c$ by the screws or bolts $d$, which pass through the bars $c$ and the rear ends of the levers $b$. The joints between the arms of the levers $b$ and the bars $c$ are strengthened against lateral strain by the bolts $e$, which pass through the said arms of the levers $b$ and through slots in the arms $f$, attached to or formed upon the forward ends of the bars $c$. The arms $f$ are curved upon arcs of circles, having the bolts $d$ as their centers. The rear ends of the bars $c$ are kept from dropping below a straight line with the lower arms of the levers $b$ by the bottoms of the slots in the curved arms $f$ coming in contact with the bolts $e$. To the forward ends of the lower arms of the right-angled levers $b$ are attached the forward ends of the arched springs $g$, the rear ends of which rest upon the bars $c$ to hold them down in line with the said lower arms of the levers $b$ under ordinary circumstances, but which will allow the rear ends of the said bars $c$ to rise should the cutters strike an obstruction they cannot cut. The rear ends of the bars $c$ are bent downward at right angles, or have downward projections formed upon them which are slotted or rabbated to receive the cutters $h$. The cutters $h$ are pivoted at their centers to the projections of the bars $c$, so that the said cutters can rock or vibrate upon their pivots to adjust themselves to the surface of the ground. The connection between the bars $c$ and the cutters $h$ is strengthened by the curved or arched rods $i$, the bends of which pass over the rear ends of the bars $c$, and their ends are attached to the end parts of the said cutters $h$.

To the forward ends of the bars E, or to the lower ends of the uprights G, are attached the middle parts of the curved rods $j$, which are designed to break down the standing stalks as the machine is drawn forward. To the forward end of each of the bars E, or to the lower end of each of the uprights G, are pivoted the forward ends of two rods, $k$, which incline from each other, as shown in Figs. 1 and 4, and have hooks formed upon their rear ends, so as to straighten the stalks as the machine is drawn forward and bring them into proper position to be cut by the cutters $h$. With this construction the cutters $h$ are forced downward to make a cut by the action of the eccentrics X, so that the cutting will be done by a positive movement, and the cutters can be adjusted to enter the ground to any desired depth.

Having thus fully described my invention, I claim as new and desire to secure by Letters Patent—

1. A stalk-cutter constructed substantially as herein shown and described, consisting of the wheels and axle A B, the curved bars E, the uprights G, the cross-bars F H, the arched bar L, the thills I J, the central bar, N, the gear-wheels U V, the shaft W, the eccentrics X, the extension-bars Y Z, the right-angled levers $b$, having springs $g$, the bars $c$, having slotted arms $f$, and the cutters $h$, as set forth.

2. In a stalk-cutter, the combination, with the wheels A and axle B, of the curved bars E, the uprights G, the cross-bars F H, the arched bar L, and the center bar, N, substantially as herein shown and described, to form a frame-work to receive the operating parts of the machine, as set forth.

3. In a stalk-cutter, the combination, with the axle B, the curved bars E, and the cross-bar F, of the gear-wheels U V, the eccentrics X, the extension-bars Y Z, the angle-levers $b$, having springs $g$, the bars $c$, having slotted arms $f$, and the cutters $h$, substantially as herein shown and described, whereby the cutters will be operated by the advance of the machine, as set forth.

BRAINERD WASHINGTON SMITH.

Witnesses:
WILLIAM M. ELLIOTT,
GEORGE W. MILLER.